April 15, 1952     F. W. STRASSHEIM     2,592,972
FILTER
Filed June 30, 1947                                  3 Sheets-Sheet 1
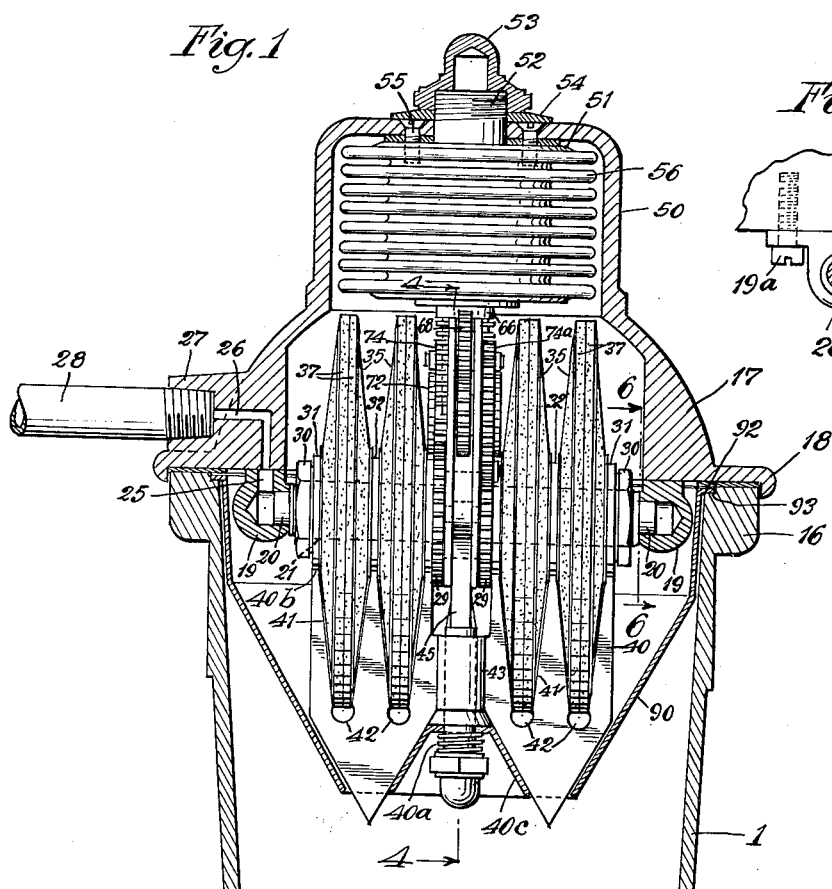
Fig. 1
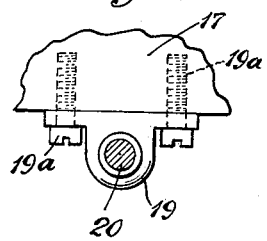
Fig. 6
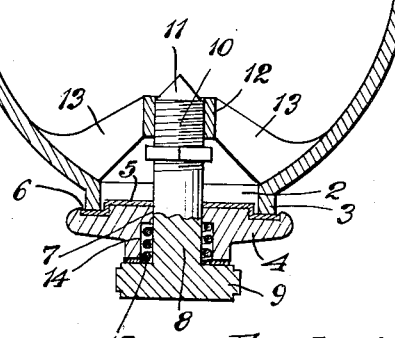
Inventor
Frederick W. Strassheim
by Parker & Carter
Attorneys April 15, 1952     F. W. STRASSHEIM     2,592,972
FILTER
Filed June 30, 1947                                       3 Sheets—Sheet 2
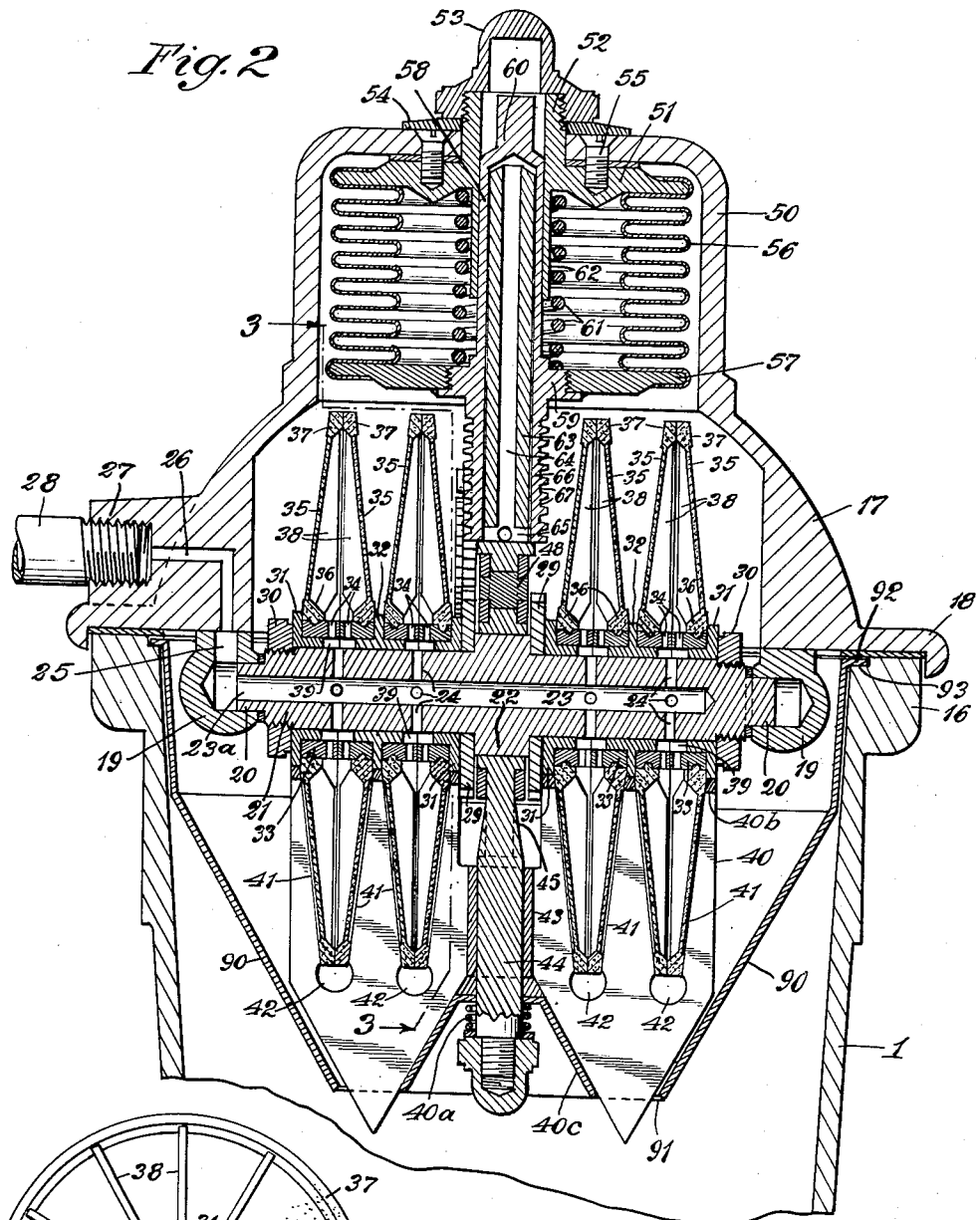
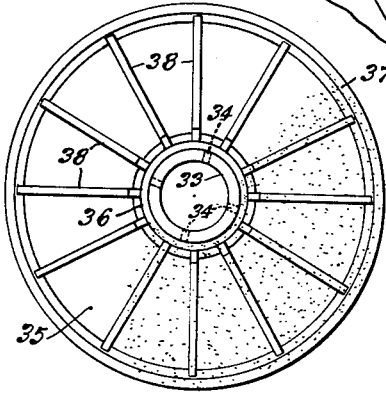
Inventor
Frederick W. Strassheim
by Parker & Carter
Attorneys April 15, 1952

F. W. STRASSHEIM 2,592,972

FILTER

Filed June 30, 1947

Inventor
Frederick W. Strassheim
by Parker & Carter
Attorneys

Patented Apr. 15, 1952

2,592,972

UNITED STATES PATENT OFFICE 2,592,972

FILTER

Frederick W. Strassheim, Chicago, Ill.

Application June 30, 1947, Serial No. 758,115

6 Claims. (Cl. 210—182)

1

The present invention relates to an improvement in filters in which a filtering layer of particles is maintained on a filtering membrane or surface.

One purpose is to provide a filter which will efficiently filter liquids, such as lubricating oil employed in motors.

Another purpose is to provide improved means for maintaining a controlled filtering layer on a filter member or members.

Another purpose is to provide improved means for scraping foreign material from the receiving side of a filter member.

Another purpose is to provide improved means for imparting relative movement to a filter member and a scraper, whereby a filtering layer of controlled depth is maintained on the surface of the filtering member.

Other purposes will appear from time to time in the course of the specification and claims.

I illustrate my invention more or less diagrammatically in the accompanying drawings wherein:

Figure 1 is a vertical section with some of the interior parts in side elevation.

Figure 2 is a vertical section on an enlarged scale, illustrating, in section, the parts which were shown in side elevation in Figure 1.

Figure 5 is a plan view of a filter member.

Figure 6 is a section on the line 6—6 of Figure 1.

Like parts are indicated by like symbols throughout the specification and drawings.

Figure 3:
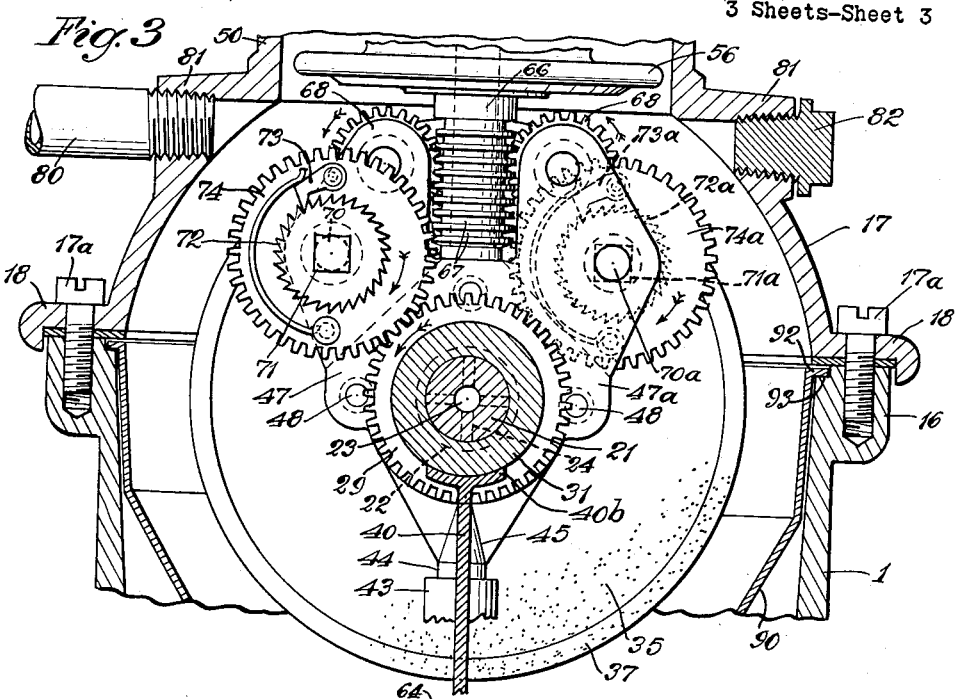
Figure 3 is a section on the line 3—3 of Figure 2.

Referring to the drawings, I generally indicates a housing or container, adapted to house the below described filter structure and to receive the foreign material filtered from the liquid. It is provided with a bottom, and, preferably, a central discharge aperture 2 which is surrounded by a flange 3. 4 is a closure cap provided with a packing 5, part of which, as at 6, engages the lower surface of the flange 3.

The cap 4 is apertured, as at 7, to receive a rotatable locking screw 8, headed as at 9. The head serves as a convenient means of manual rotation. The screw has an upper or inner screw-threaded portion 10 terminating in a conical point 11. It is adapted to enter the inwardly screw-threaded ring 12 mounted on any suitable supports 13 and aligned therewith on the axis of the apertured tube.

The closure cap 4 is provided with a generally cylindrical aperture 14 surrounding the screw 8

2 and adapted to receive a coil spring 15 which, when the screw is tightened, is compressed between the head 9 and the inner end of the aperture 14, thus preventing unintended loosening of the cap.

The housing 1 is shown as provided with a circumferential enlargement 16 at the top, on which rests the outer flange 18 of the closure 17. In the views herein I illustrate the closure as constituting the support and base for the below described filtering structure. It will be understood, however, that by a slight change in design the filtering structure could be mounted on the housing 1 itself. The closure 17 is provided with downwardly extending supporting lugs 19 which are provided with generally cylindrical bearing apertures adapted to receive the ends 20 of the rotatable shaft 21. The shaft is shown as provided with a central enlargement 22, an axial passage 23, and radial passages 24. The journals 19 which receive the shaft ends 20 are shown as depending from the cover 17, to which they may be removably secured by any suitable screws or securing members 19a. The cover 17 may be suitably fastened to the housing flange 16 by any suitable securing members 17a.

One of the members 19 is shown as including a fluid discharge passage 25 communicating with a duct 26 in the cover 17. The duct passes outwardly through an enlargement 27, having a screw-threaded aperture to receive the liquid discharge pipe 28. It will be observed that one end of the axial passage 23 is open, as at 23a, and that the duct 25 is beyond the cylindrical end portion of the shaft. Thus liquid which flows inwardly through the radial passages 24 may flow along the axial passage 23 and outwardly through the ducts or passages 25, 26 and 28.

The filter elements proper, of which four are shown along the shaft 21, may be arranged in pairs at each side of the enlargement 22. At each side of the enlargement are toothed gears 29, the purpose of which will later appear. At each end of the shaft 21 is a locking ring or nut 30. Between the gears 29 and the locking nuts 30 are the angular spacers 31 and the T-shaped spacers 32, which are shown as defining four seats to receive the filter members proper. Each filter member includes a central ring 33 having apertures 34. Bonded to and extending outwardly from each ring is a filter web 35 which has an inner thickened portion 36, a terminal thickened portion 37, and internal strengthening ribs 38.

The filter members are arranged in reverse pairs, as shown in Figure 2, with opposed members 37 abutting against each other. The result is a hollow filter body. The members 35 are formed of pervious material, such as bonded powdered metal. Their porosity should be very fine, but they must be able to pass the liquid to be filtered. Assuming that the space within the housing 1 and the cover 17 receives the liquid to be filtered, the solids are deposited on the exteriors of the webs 35 and the filtered liquid flows through the apertures 34 and thus to the radial inlets 24, above described. The spacing members 31 and 32 are spaced apart, as shown at 39, and thus do not interfere with the flow of the liquid.

I prefer to filter by means of the formation of a relatively thin film of solids on the exteriors of the members 35. I find that I obtain an exceedingly efficient result where I maintain a thin film of solids on the surface. In order to obtain and maintain such a film I provide scraping or cutting means. I illustrate, for example, the scraper cones 40, having generally triangular notches 41 which are contoured in relation to the outer surfaces of the members 35, to provide a small and generally uniform clearance. However, I find it advantageous to have a certain outward projection of the portions 36 and 37, as shown in Figure 2, with the result that the outer faces of 36 and 37 may engage the cones 40, and maintain a closely controlled clearance between the exterior surfaces of the webs 35 and the walls of the notches 41. I also find it advantageous to cut away the outer or lower ends of the notches, as at 42. The cone structure may be mounted in any suitable fashion. I illustrate, for example, a securing sleeve 43 which may be threaded on a pin 44.

The pin 44 depends from and forms part of a collar or support 45 which surrounds the enlargement 22 of the shaft 21. It will be understood that it is supported by the shaft, but that the shaft rotates within the cylindrical surface 46. The member 45 carries supporting web structures 47, 47a, one being located on each side of the member 45, and secured by any suitable studs 48. Between them are mounted a system of gears which are employed to impart relative slow rotation, step by step, to the shaft 21, as will later appear.

It will be understood that any suitable system may be employed to rotate the shaft 21 and thus to impart relative movement to the scraper system 40 and to the filter members. I illustrate, for example, a sub housing 50, which extends upwardly from and may be part of the cover 17. Mounted within this housing 50 is a top member 51 having an upwardly extending sleeve 52 adapted to receive a securing nut or cover closure 53 which downwardly abuts against a washer or protective member 54 which overlies the heads of the screws 55 which hold the member 51 in place. The member 51 constitutes the top member of a bellows 56 which, in turn, is secured to a lower member or disk 57 which is assembled with or has secured to it, as by an enlargement 59, a hollow sleeve 58. This sleeve has its top closed, as at 60, and an upper portion which may extend upwardly into a receiving hollow in the cover 53. A spring 61 normally urges the bellows toward open position. It will be noted that the member 51 has a stop sleeve 62. Thus the contraction of the bellows against the spring 61 is limited.

Extending upwardly within the hollow sleeve 58 is a hollow stem 63 which forms part of the member 45. Its axial passage 64 is provided at the bottom with radially extending apertures 65. The hollow sleeve 58 has a downward extension 66 which is outwardly grooved, as at 67, to provide circumferentially extending teeth which, however, are not shown as forming screw threads.

Meshing with the ridges or teeth 67 are idler gears 68 which are pivoted between the webs 47 and which, in turn, mesh with pinions 69, 69a, similarly mounted between the members 47, but keyed to or held against rotation in relation with their shafts 70 and 70a. The shafts 70 and 70a are squared at their opposite ends, as at 71, 71a, it being understood that the shaft 70 carries at one end the ratchet wheel 72, whereas the shaft 70a carries at its opposite end the ratchet wheel 72a, thus obtaining a reverse action. Each such ratchet wheel is provided with an appropriate pawl 73, 73a, pivoted to an associated gear 74, 74a, each gear being free to rotate, and being in mesh with the gears 29 which are held against rotation in relation to the shaft 21. Thus the expansion of the bellows 56 will rotate the shaft 21 through the gear 74a, whereas contraction of the bellows 56 will rotate the shaft 21 through the gear 74. It will be understood, therefore, that the shaft 21 may be given a step-by-step rotation in response to either the expansion or the contraction of the bellows 56.

Considering my system as being connected into a lubricating cycle or closed system, such as the lubricating system of an automobile or other engine, it will be understood that the housing 1 is full of oil and that a continuing flow of oil is delivered to it through the oil inlet 80, which is shown as screw-threaded into any suitable enlargement 81, and which has oil supplied to it from any suitable pump or pressure means, not herein shown. As a matter of convenience, I illustrate one of the openings 81 at each side of the cover 17, that one which is not used being closed by any suitable closure plug 82. As the pressure of the oil within the housing 1 increases, the bellows 56 are compressed, causing a rotation of the shaft 21. On the other hand, as the pressure drops, the spring 61 is effective to expand the bellows, still causing a rotation of the shaft 21 in the same direction. Thus the shaft 21, and with it the filter webs 35, are rotated in relation to the scrapers 40, and a thin film of solids is maintained on the outer surfaces of the webs 35 because of the controlled clearance between their outer surfaces and the walls of the grooves or slots 41.

As a matter of convenience, I may employ a sludge director 90 which is formed to surround the scraper structure 40, and which has downward discharge outlets 91 and an upper flange 92 seated in an appropriate enlargement 93 in the upper edge portion 16 of the housing 1.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

I provide a pervious filtering member such as the thin layer 35 of porous material. This acts as a septum or membrane against which the solids to be filtered may be deposited. I deliver the liquid to be filtered to one side of the septum 35, to the space in the upper part of the filter housing, and about the rotary filter members. I preferably maintain a definitely controlled pressure differential, in the sense that I limit the pressure differential between the depositing side and the liquid filtering side of the septum. Any suitable means may be employed for maintaining the desired pressure differential. Or I may simply employ my filtering unit in a cycle in which, under normal conditions, no unduly high pressure differential is created. This is the case in the ordinary cycle or circuit in which the lubricant of an automobile power plant is filtered. It will be understood, of course, that I may, if desired, use a by-pass or other suitable means for reducing or controlling the pressure differential.

It will be noted that the outlet passage 26 is somewhat restricted in relation to the bore of the inlet passage 80. This is important in connection with controlling the rate of flow of the dirty oil to the exterior of the filter and in relation to the rate of escape of the filtered oil through the outlet. With a large outlet opening it would be impossible to build up an effective pressure, and the filtering operation would be inhibited. The rate of flow of the dirty oil to and through the filter must be controlled, and an excess rate of flow would cause an excess packing of material against the exterior of the filter septum. Thus controlling the relative capacity of the passages 26 and 80 is an important feature in connection with controlling the rate of deposit of particles or solids on the exterior of the septum. It is important not to pack a dense mass of foreign material on the exterior of the filter septum, since clogging would result, and a destruction of the filtering operation. The oil flows relatively slowly and easily through the filtering elements, with a relatively small pressure differential between the exterior and the interior of the filter members.

I employ pores or apertures, through which the liquid passes, of suitably small, effective cross-section. But I do not rely on these pores themselves to perform the primary filtering function. Instead, I build up on the filter medium a layer of solids from the material to be filtered. This layer, rather than the filter medium itself, regularly performs the filtering operation. It is important, however, to maintain this layer at a thickness proper to cause it to carry out its filtering function. For example, I use the scraper structure shown in Figures 1 and 2, in which the scraper element 40 is yieldingly thrust into place by a spring 40a. As will be clear from Figure 2, the enlargements 36 and 37 constitute limiting abutments against which the edges 41 abut. Thus the layer of solids on each filter member is quite precisely controlled, as to thickness, and, as to filter parts or elements rotated, a substantially constant predetermined thickness is obtained.

Any suitable means may be employed to maintain the scraper in proper position. As will be clear from Figure 3, it is provided with a laterally expanded portion 40b at its upper edge, which abuts against a hub 31 and which is effective to maintain a proper alignment of the scraper structure as the structure is upwardly thrust by the spring 40a.

It will be noted that an inner cone 40c is employed, against which the spring 40a abuts at its upper end, the cone 40c, with the surrounding outside cone 90, constituting a discharge member for the sludge scraped from the exterior of the filter members.

Figure 4:
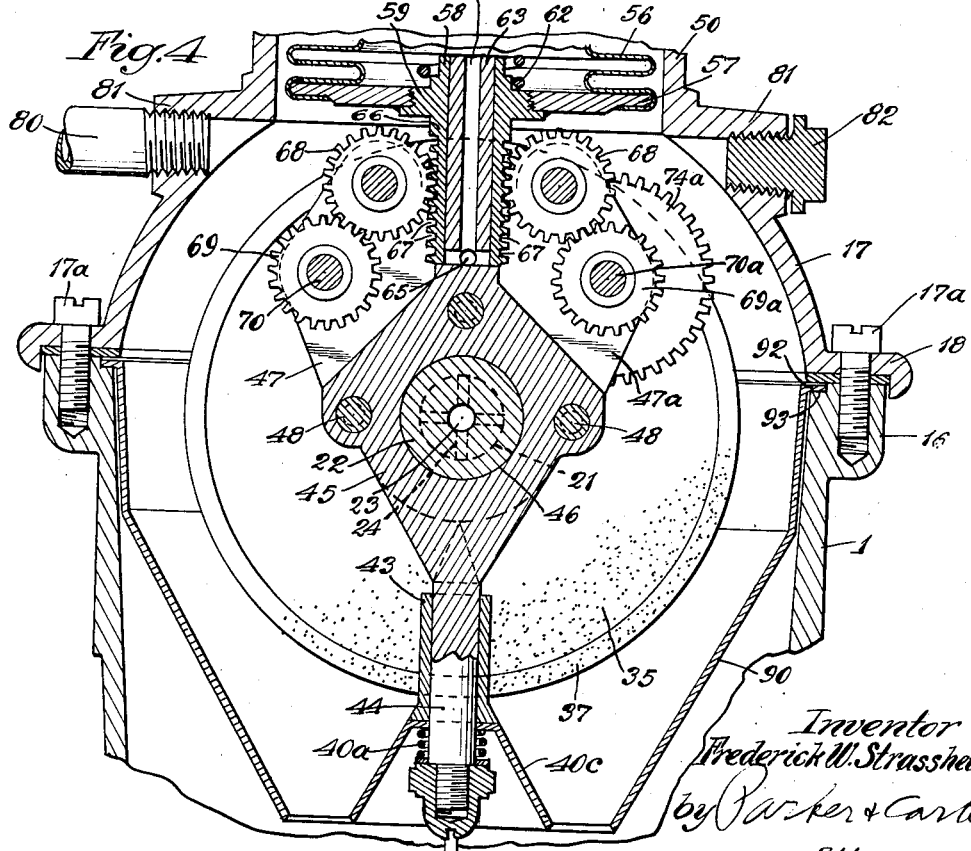
Figure 4 is a section on the line 4—4 of Figure 1.

It will be understood that I may employ any suitable means for causing a relative rotation of the filter members and of the scraper 40. In the present application, I illustrate a bellows structure which expands and contracts in response to variations in pressure of the oil being filtered. This successive expansion and contraction, through the above described system of gearing, shown in detail in Figures 3 and 4, causes a one-way rotation of the filter assembly, which rotates all of the individual filter elements through the slots in the scraper 40. This rotation is at relatively slow speed, and is, in practice, intermittent. But it is effective to maintain the desired substantial uniformity of depth of the exterior layer of solids on the individual filter members.

As a matter of detail, it is noted that the spring 15, associated with the closure cap 4, is normally effective to hold the closure cap sealed against the flange 3 until the screw 10 has been completely released from the sleeve 12, into which it is threaded. Thus, until the user voluntarily removes the cap 4, the contents of the sludge chamber do not escape through the outlet 2.

It will be understood, of course, that the particular means I describe and show for causing a rotation of the shaft 21 may be replaced by other suitable means, electrical or mechanical, automatic or non-automatic, as seems desirable to the user.

I claim:

1. In a filter for liquid, a housing, means for delivering to the interior of the housing the liquid to be filtered, a hollow filter member of self-sustaining liquid-pervious material constructed in two abutting reversed, conical halves, means for operatively supporting the hollow filter member within the housing, means for withdrawing filtered liquid from the interior of said hollow filter member, a stationary scraper adjacent the filtering surface of said hollow filter member, and pressure responsive means for automatically imparting, in response to pressure changes within said housing, generally continuous relative movement to said scraper and said filter member at a time predetermined as that time best suited for a scraping operation, scraper clearance defining means carried by the hollow filter member and operatively engaged by the scraper to maintain a predetermined clearance between the scraper and the filtering surface of the filter, the clearance between said scraper and filter member being generally uniform throughout the filtering area and being sufficiently close to maintain on the surface of the filter member a thin layer of solids deposited by and originating in the filtered liquid and constituting a primary filtering medium on said hollow filter member, said housing having a sludge outlet aperture and a removable closure therefor.

2. In a filter for liquid, a housing, means for delivering to the interior of the housing the liquid to be filtered, a hollow filter member in said housing, of liquid-pervious material, means for withdrawing filtered liquid from the interior of said hollow filter member, a stationary scraper adjacent the surface of said hollow filter member, and means for automatically imparting, in response to pressure changes within said housing, generally continuous relative movement to said scraper and said filter member at a time predetermined as that time best suited for a scraping operation, the clearance between said scraper and filter member being generally uniform throughout the filtering area and being sufficiently close to maintain on the surface of the filter member a thin layer of solids deposited by and originating in the filtered liquid, said housing having a sludge outlet aperture and a removable closure therefor, the filter member including a hub, two concave webs of solid porous material arranged in reverse pairs abutting to define an internal space and extending outwardly from said hub, said hub having liquid inlet apertures in communication with the interior of said hollow web, and a liquid discharge duct in communication with the interior of said hub and adapted to receive a flow of filtered liquid.

3. In a filter for liquid, a housing, means for delivering to the interior of the housing the liquid to be filtered, a hollow filter member, in said housing, of liquid-pervious material, means for withdrawing filtered liquid from the interior of said hollow filter member, a stationary scraper adjacent the surface of said hollow filter member, and means for automatically imparting, in response to pressure changes within said housing, generally continuous relative movement to said scraper and said filter member at a time predetermined as that time best suited for a scraping operation, the clearance between said scraper and filter member being generally uniform throughout the filtering area and being sufficiently close to maintain on the surface of the filter member a thin layer of solids deposited by and originating in the filtered liquid, said housing having a sludge outlet aperture and a removable closure therefor, and a spring assembly in pressure contact with and normally adapted continuously to urge said scraper toward said filter member.

4. In a filter for liquid, a housing, means for delivering to the interior of the housing the liquid to be filtered, a hollow filter member, in said housing, of liquid-pervious material, means for withdrawing filtered liquid from the interior of said hollow filter member, a stationary scraper adjacent the surface of said hollow filter member, and means for automatically imparting, in response to pressure changes within said housing, generally continuous relative movement to said scraper and said filter member at a time predetermined as that time best suited for a scraping operation, the clearance between said scraper and filter member being generally uniform throughout the filtering area and being sufficiently close to maintain on the surface of the filter member a thin layer of solids deposited by and originating in the filtered liquid, said housing having a sludge outlet aperture and a removable closure therefor, the filter member having annular outward enlargements at its inner and outer edges adapted to limit the movement of a scraper toward the larger annular area of the filter member between said enlargements in which the greatest filtering action occurs.

5. In a filter for liquid, a housing, means for delivering to the interior of the housing the liquid to be filtered, a hollow filter member, in said housing, of liquid-pervious material, means for withdrawing filtered liquid from the interior of said hollow filter member, a stationary scraper adjacent the surface of said hollow filter member, and means for automatically imparting, in response to pressure changes within said housing, generally continuous relative movement to said scraper and said filter member at a time predetermined as that time best suited for a scraping operation, the clearance between said scraper and filter member being generally uniform throughout the filtering area and being sufficiently close to maintain on the surface of the filter member a thin layer of solids deposited by and originating in the filtered liquid, said housing having a sludge outlet aperture and a removable closure therefor, and a bellows structure in direct connection with said housing and responsive to pressure changes in said housing, said bellows structure including an internal spring, a geared shaft adapted to move with the movement of the bellows and adapted to turn a gear train by such movement, the turning of said gear train resulting in movement of filter members in one annular direction when the bellows either contracts or expands.

6. In a filter for liquid, a housing, means for delivering to the interior of the housing the liquid to be filtered, a hollow filter member of self-sustaining liquid-pervious material, means for operatively supporting the hollow filter member within the housing, means for withdrawing filtered liquid from the interior of said hollow filter member, a stationary scraper adjacent the filtering surface of the hollow filter member, means for imparting relative movement to said scraper and said filter member scraper clearance defining means carried by the hollow filter member and operatively engaged by the scraper to maintain a predetermined clearance between the scraper and the filtering surface of the filter, the clearance between the scraper and filter member being generally uniform throughout the filtering area and being sufficiently close to maintain on the surface of the filter member a thin layer of solids of substantially uniform thickness, deposited by and originating in the filtered liquid, of a thickness sufficient to maintain a filtering action and constituting a primary filtering medium on said hollow filter member.

FREDERICK W. STRASSHEIM.

REFERENCES CITED

The following references are of record in the file of this patent:

UNITED STATES PATENTS

| Number | Name | Date |
|---|---|---|
| 521,591 | Lynn | June 19, 1894 |
| 1,264,635 | Graham | Apr. 30, 1918 |
| 1,469,026 | Silvester | Sept. 25, 1923 |
| 1,680,029 | Sweetland | Aug. 7, 1928 |
| 1,725,811 | Manning | Aug. 27, 1929 |
| 2,077,744 | Cuno et al. | Apr. 20, 1937 |
| 2,083,887 | Wieneke | June 15, 1937 |
| 2,120,455 | Barnebl | June 14, 1938 |
| 2,308,716 | Re Qua | Jan. 19, 1943 |
| 2,430,078 | Reinsch et al. | Nov. 4, 1947 |

FOREIGN PATENTS

| Number | Country | Date |
|---|---|---|
| 780,398 | France | Jan. 29, 1935 |